United States Patent [19]

White

[11] 4,129,555

[45] Dec. 12, 1978

[54] POLY-PHENYLENE OXIDE PROCESS EMPLOYING AMINOPHENOL REACTANTS

[75] Inventor: Dwain M. White, Schenectady, N.Y.

[73] Assignee: General Electric Company, Schenectady, N.Y.

[21] Appl. No.: 780,289

[22] Filed: Mar. 23, 1977

[51] Int. Cl.$^2$ ............... C08G 65/44; C08L 25/04
[52] U.S. Cl. .................. 260/823; 260/876 R; 260/892; 260/893; 260/898; 528/210; 260/874
[58] Field of Search ........... 260/47 ET, 47 R, 876 R, 260/874, 892, 898

[56] References Cited

U.S. PATENT DOCUMENTS

| | | | |
|---|---|---|---|
| 3,379,672 | 4/1968 | Breshears | 260/37 |
| 3,383,435 | 5/1968 | Cizek | 260/874 |
| 3,573,257 | 3/1971 | Nakashio et al. | 260/47 ET |
| 4,029,609 | 6/1977 | Tanaka | 260/2 R |

*Primary Examiner*—Carman J. Seccuro
*Attorney, Agent, or Firm*—F. Wesley Turner; Joseph T. Cohen; Charles T. Watts

[57] ABSTRACT

Process of forming polyphenylene oxide under polymer forming reaction conditions which comprises contacting an aminophenol with another phenol in the presence of an effective oxidative coupling catalyst. The resulting polyphenylene oxide resins in combination with styrene resins provide thermoplastic compositions having improved impact strength properties.

8 Claims, No Drawings

POLY-PHENYLENE OXIDE PROCESS EMPLOYING AMINOPHENOL REACTANTS

This invention relates to a process of forming self-condensation products of an aminophenol and another phenol under polymer forming reaction conditions which comprises contacting an aminophenol and another phenol with oxygen in the presence of an effective oxidative coupling catalyst system.

DESCRIPTION OF THE PRIOR ART

Self-condensation of phenol, referred to herein as "another phenol", employing oxygen in combination with an effective oxidation coupling catalyst system to form a polyphenylene oxide is described in various U.S. Patents including Hay's U.S. Pat. No. 3,306,879, 3,914,266, application Ser. No. 540,473, filed Jan. 13, 1975, a continuation-in-part of Ser. No. 441,295, filed Feb. 11, 1974, now abandoned, and Olander's U.S. Pat. Nos. 3,956,442, 3,965,069, 3,972,851 and Ser. No. 582,910, filed June 2, 1975.

I have found that the self-condensation products of certain aminophenols and another phenol under polymer forming reactive conditions employing any of the oxidative coupling catalyst systems known to the prior art, provide polyphenylene oxide polymers which when blended with polystyrene resins provide resin blends having improved impact property profiles.

DESCRIPTION OF THE INVENTION

This invention embodies a polyphenylene oxide process comprising self-condensation of an aminophenol and another phenol under polymer forming reaction conditions carried out in the presence of an effective oxidative coupling catalyst system.

The aminophenols which can be employed in my process comprise any aminophenol having the following general formula:

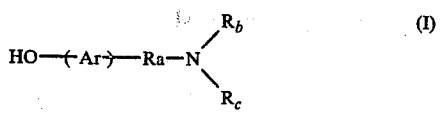

wherein Ar is at least a divalent arene, preferably monocyclic, radical having at least one hydroxyl group, —OH, and at least one

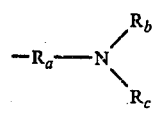

group directly bonded to arene ring carbon atoms subject to the proviso that at least one group and at least one amino group is ortho or para, preferably para positioned relative to the other group. The arene radical can be any monocyclic or polycyclic arene radical. A presently preferred amino phenol reactant is of the formula:

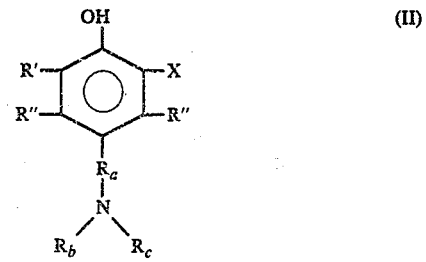

wherein X is hydrogen, chlorine, bromine, or iodine, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen, $R_a$ being methylene or a substituted methylene hydrocarbon group, including saturated and unsaturated, branched and unbranched, acyclic and cyclic, aromatic and aliphatic hydrocarbon groups, $R_b$ and $R_c$ being acyclic or cyclic — including combinations of $R_b$ and $R_c$ to form a cyclic ring structure(s) — saturated or unsaturated hydrocarbon groups, subject to the proviso that $R_b$ and $R_c$ either alone or in combination do not constitute an aromatic ring structure having an aromatic ring carbon atom directly bonded to the nitrogen atom of the amino group and further subject to the proviso that at least one of $R_b$ or $R_c$ is a hydrocarbon group. Preferably $R_a$ is a divalent alkylene radical, $R_b$ is a hydrogen, a primary or secondary alkyl radical, and $R_c$ is a primary or secondary alkyl radical. In a presently preferred embodiment $R_a$ is methylene and $R_b$ and $R_c$ are $C_{1-5}$ primary or secondary alkyl radicals. Generally illustratively the $R_a$ group can be methylene, ethylidene, isopropylidene, cyclopentylidene, benzylidene, 2,4-cyclohexadiene-1-ylidene, etc., the $R_b$ and $R_c$ group(s) or combinations thereof being methyl, ethyl, normal propyl, isopropyl, secondary butyl, tertiary butyl, normal hexyl, cyclohexyl, dodecyl, eicosyl, triacontyl, etc.

The another phenol can be any of the phenols employed in any of prior art process for the preparation of polyphenylene oxide. Among the phenols of the prior art defined herein as "another phenol" are those of the following structural formula:

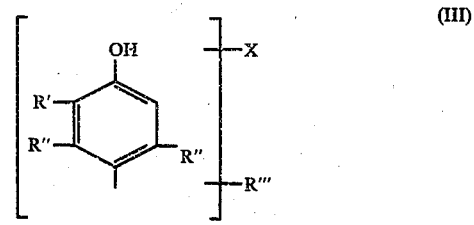

wherein X, R' and R" are the same as defined hereinbefore with respect to the aminophenol and R'" being the same as R' and in addition, a halogen.

Representative of the classes of substituents, such as X, R' and R" which can be associated with the aminophenol of formula (II) or X, R', R" and R'" which can be associated with the another phenol of formula (III), are any of the substituents associated and positioned at analogous locations relative to the hydroxyl group of any of the another phenols described by Hay and Olander in their U.S. patents and applications referred to hereinbefore. The description of these substituents as described by Hay and Olander are hereby incorporated herein in their entirety by reference.

In general, any of the prior art phenols defined herein as "another phenol", solvents, bases, metals, chelating agents, ligands, primary, secondary or tertiary amines, oxidants, including oxygen, etc. or reaction conditions relative to time, temperature or pressure disclosed in Hay's and Olander's U.S. Patents and Patent applications referenced herein can be employed in my process. Accordingly, their descriptions are also hereby incorporated herein in their entirety by reference.

Any proportion of aminophenol to the another phenol can be employed. Preferably the amount of aminophenol is sufficient to effect an improvement in the impact properties of polystyrene resins when blended with the polyphenylene oxide reaction product of my invention. In general, the mole ratio range of aminophenol to another phenol can vary broadly, e.g., from a value of about 0.1:99.9 to 99.9:0.1. However, a presently preferred range is from about 0.25:99.75 to 2:98, and more preferably from about 0.5:99.5 to 1.5:98.5, since, generally optimum improvement in impact properties of polymer blends are obtained when the aminophenol comprises approximately about 1% of the reactive phenols contained by the reaction medium.

Polyphenylene oxide polymers which in combination with styrene resins generally provide optimum impact properties contain from 250 to 2,000, preferably from 500 to 1650 and more preferably from 750 to 1300 parts per million by weight of nitrogen bound to the skeletal backbone of the polymer. Accordingly, those skilled in the art by means of routine experimentation can determine the amount of aminophenol reactant necessary to provide optimum polymer impact blend properties.

In another preferred embodiment of my invention, the polyphenylene oxide prepared by my process is combined with a styrene resin having at least 25% by weight of polymer units derived from a compound of the formula:

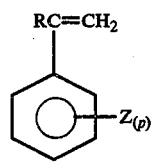

(IV)

where R is hydrogen, lower alkyl or halogen; Z is a member selected from the class consisting of vinyl, hydrogen, chlorine and lower alkyl; and p is a whole number equal to from 0 to 5, having improved impact strength. The term "styrene resin" as used throughout this disclosure and in the claims, and as defined by the above formula (IV) includes, by way of example, homopolymers such as polystyrene and polychlorostyrene, the modified polystyrenes, and the styrene containing copolymers, such as the styrene-acrylonitrile copolymers, styrene-butadiene copolymers, styrene-acrylonitrile-α-alkyl styrene copolymers, styrene-acrylonitrile-butadiene copolymers, poly-α-methylstyrene, copolymers of ethylvinylbenzene and divinylbenzene, including blends of "styrene resins", and the like. Presently preferred styrene resins are the high impact polystyrenes, the styrene-acrylonitrile-butadiene copolymers and styrene-butadiene copolymers.

The method of blending polyphenylene oxide with styrene resin is not critical and does not constitute a part of this invention. The preferred method comprises blending the two polymers in powder or granular form, extending the blend, and chopping into pellets.

The polyphenylene oxides and the styrene resins are combinable with each other in all proportions. Consequently, compositions comprising from 1 to 99 percent, by weight, polyphenylene oxide and from 99 to 1 percent, by weight, styrene resin are included within the scope of the invention.

In general, preferred resin blends contain from about 30:70 to 70:30, more preferably 40:60 to 60:40, and even more preferably from 45:55 to 55:45 parts by weight of polyphenylene oxide and styrene, respectively. The above preferences are based on the finding that optimum notched Izod Impact Strength (ASTM D256) property profiles for polyphenylene oxide-styrene resin blends (hereafter referred to N.I. resin blend values) are more readily obtained when approximately equal proportions of polyphenylene oxide and styrene resins are blended together.

In general, the polyphenylene oxide polymers prepared by my process when combined with high impact polystyrene resins exhibit Notched Izod impact resin values of at least about 2.5 to about 5.0, or 7.5 or even higher in some instances. In general, polyphenylene oxide-styrene resin blend properties of my invention correspond with the polyphenylene oxide-styrene resin blend property profiles described by Cizek in U.S. Pat. No. 3,383,435.

That the polyphenylene oxide process by my invention is unobvious is illustrated by the fact that when an amino phenol is employed in my process wherein the amino group is ortho to the hydroxyl group of the aminophenol, the polyphenylene oxide products which result when combined with high impact polystyrene resins do not exhibit improved impact properties as described hereinbefore.

In order that those skilled in the art may better understood my invention, the following examples are given which are illustrative of the best mode. In the examples the following general procedures were employed. All parts are by weight unless otherwise stated.

General Procedures

A series of polyphenylene oxide polymers were prepared according to the following procedure(s).

(A) Polymerization of 2,6-dimethylphenol and 2,5-dimethyl-4-(N,N-diethylaminomethyl)phenol using a Mn(II)benzoin oxime chelate catalyst.

A 2.5 gal. reactor equipped with condenser, thermocouple, oxygen inlet tube, mechanical stirrer, monomer addition line and an external sampling loop with a pressure gauge to monitor solution viscosity was charged with 2.0 liters of toluene, 600 ml. methanol, 255 ml. of a 2,6-dimethylphenol solution (800 gms. of 2,6 dimethylphenol in solution in 900 ml. toluene) and 32 gms. of a 50% aqueous sodium hydroxide solution. Oxygen was passed through the reactants at 8 SCFH. 1.99 gms, benzoin oxime and 0.55 gms. manganese(II) dichloride were added. The remainder of the 2,6-dimethylphenol-toluene solution plus 27.12 gms. of 2,5-dimethyl-4-(N,N-dimethylaminomethyl) phenol was added over a 40 minute period to the reactor. External cooling was applied when required to maintain a reaction temperature of 28° C. Reaction temperatures and pressure in the sampling loop were as follows:

| TIME, Min. | TEMPERATURE, °C. | PRESSURE, psi |
|---|---|---|
| 0 | 23 | — |
| 15.0 | 28 | — |
| 62.2 | 28 | 2.5 |
| 63.0 | 28 | 10.0 |
| 69.3 | 28 | 25.0 |
| 76.8 | 28 | 40.0 |
| 105.0 | 28 | 46.0 |

After 105 minutes, 36 gms. glacial acetic acid was added to stop the reaction. The reaction mixture was transferred to a glass vessel and 3 liters of methanol were added slowly to precipitate the polymer. 745 gms. of polymer was washed thoroughly with methanol and dried at 80° in a circulating air oven. Reaction parameters and product characterizations were as follows: mole ratio 2,6-dimethylphenol to 2,5-dimethyl-4-(N,N-diethylaminomethyl)phenol 98:2, intrinsic viscosity $[\eta]$ 0.64 dl./g. measured in chloroform at 25° C, and 1098 ppm by weight of chemically bound nitrogen.

For control purposes a similar procedure was followed employing only 2,6-dimethylphenol as the reactant. Reaction parameters and product characterizations were as follows: mole ratio of 2,6-dimethylphenol to 2,5-dimethyl-4-(N,N-diethylaminomethyl)phenol 100:0, intrinsic viscosity 0.61 dl./g. measured in chloroform at 25° C, and 215 ppm by weight of chemically bound nitrogen.

(B) Polymerization of 2,6-dimethylphenol and 2,5-dimethyl-4-(N,N-diethylaminomethyl)-phenol using a Cu(II) N,N'-di-(t-butyl)-1,2-ethylenediamine catalyst.

A 2.5 gal. reaction equipped as described in (A) was charged with 3.6 liters of toluene, 1.85 gms. N,N'-di(t-butyl)-1,2-ethylenediamine (DBED), 21.8 gms. dimethylbutylamine, 1.2 gms. Aliquat 336® tricaprylylmonomethylammonium chloride, 679 ml. 95% methanol and 62 ml. of a catalyst solution prepared by adding 23.1 ml. of bromine to a mixture containing 86.78 gms. 2,6-dimethylphenol, 6.21 gms. cuprous oxide and 500 ml. of anhydrous methanol. An oxygen flow rate of 8 SCFH was initiated and a solution containing 1200 gms. 2,6-dimethylphenol, 20.33 gms. 2,5-dimethyl-4-(N,N-diethylaminomethyl)phenol, 1.85 gms. DBED in 1326 ml. of toluene was added to the reactor at a uniform rate over a 30 minute period. Reaction temperatures and pressures in the sampling loop were as follows:

| TIME, Min. | TEMPERATURE, °C. | PRESSURE, psi |
|---|---|---|
| 0.0 | 25 | — |
| 11.0 | 40 | — |
| 45.6 | 40 | 10 |
| 48.5 | 50 | 20 |

The reaction was terminated after 48.5 min. by the addition of 20 gms. of a 38% aqueous trisodium ethylenediaminetetraacetate (EDTA) solution. Oxygen flow was replaced by nitrogen flow. The reaction mixture was diluted from 20% solids to 10% solids with toluene at 50° C. and passed through a liquid-liquid centrifuge to remove the aqueous phase. Precipitation of the polymer by adding three volumes of methanol produced poly(phenylene oxide) in 95% yield after washing with methanol and drying at 80° C. in a circulating air oven. Reaction parameters and product characterizations were as follows: mole ratio 2,6-dimethylphenol to 2,5-dimethyl-4-(N,N-diethylaminomethyl)-phenol 99:1, intrinsic viscosity 0.46 dl./gm. measured in chloroform at 25° C, and 1231 ppm by weight of chemically bound nitrogen.

For control purposes a similar procedure was followed employing only 2,6-dimethylphenol as the reactant. Reaction parameters and product characterizations were as follows: mole ratio of 2,6-dimethylphenol to 2,5-dimethyl-4-(N,N-diethylaminomethyl)phenol 100:0, intrinsic viscosity 0.45 dl./gm. measured in chloroform at 25° C, and 480 ppm by weight of chemically bound nitrogen.

Set out in Table I hereafter is a summary of a series of poly(phenylene oxides) prepared according to the above general procedures. The summary includes general reaction parameters, including the type of $R^1$, $R^2$, $R^3$, $R^4$ or $R^5$ substituents (when other than hydrogen) associated with aminophenol reactants of the general formula:

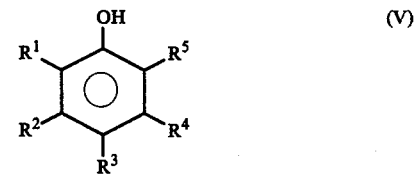

(V)

as well as associated resulting polyphenylene oxide and polyphenylene oxide styrene resin blend properties.

The poly(phenylene oxide)-styrene resin blends described in Table I contained 50 parts of poly(phenylene oxide), 50 parts of high impact polystyrene, plus minor amounts, e.g. less than 10 parts, of stabilizing additives. The blends were compounded on a Werner and Pfleiderer K-28 twin screw extruder at a temperature range from 260° to 293° C. and at rate of 15 pounds per hour. Extruded samples were air dried 2 hours at 125° C. and molded on a Battenfield Injection Molding machine (2.8 oz. shot size) having a 510° F. barrel temperature, a 180° F. mold surface temperature, an 8 sec. injection time, and an 8000 psi injection pressure.

TABLE I

| | | Polyphenylene Oxide Reaction Parameters | | | Polyphenylene Oxide Properties | | | Polyphenylene Oxide/Styrene Resin Blend Properties | |
|---|---|---|---|---|---|---|---|---|---|
| Run No. | Aminophenol Substituents | | Amino Phenol (mole %) | Catalyst System | I.V.[1] | I.V.[2] Pressed Film | N(ppm) | N.I.[3] | E%[4] |
| 1 | None - Control Run | | 0 | Mn | 0.56 | 0.58 | 215 | 1.5 | 63 |
| 2 | $R^1 = -CH_3$ | | 0.5 | Mn | 0.56 | 0.59 | 299 | 1.7 | 61 |
| | 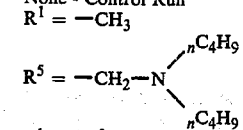 | | | | | | | | |
| 3 | $R^1$ and $R^5$ = | | | | | | | | |

TABLE I-continued

| Run No. | Aminophenol Substituents | Polyphenylene Oxide Reaction Parameters | | Polyphenylene Oxide Properties | | | Polyphenylene Oxide/Styrene Resin Blend Properties | |
|---|---|---|---|---|---|---|---|---|
| | | Amino Phenol (mole %) | Catalyst System | I.V.[1] | I.V.[2] Pressed Film | N(ppm) | N.I.[3] | E%[4] |
| 4 | Same as Run No. 2 R¹ and R⁴ = —CH₃ | 1.0 | Mn | 0.57 | 0.62 | 263 | 1.7 | 53 |
| | R³ = —CH₂—N(C₂H₅)(C₂H₅) | 1.0 | Mn | 0.50 | 0.71 | 1110 | 4.2 | 76 |
| 5 | Same as Run 4 | 1.0 | Mn | 0.58 | 0.81 | 1094 | 4.4 | 72 |
| 6 | Same as Run 4 | 2.0 | Mn | 0.64 | 0.88 | 1098 | 6.6 | 64 |
| 7 | R¹ and R⁵ = —CH₃ | 1.0 | Mn | 0.56 | 0.69 | 1041 | 4.8 | 75 |
| | R³ = —CH₂—N(C₂H₅)(C₂H₅) | | | | | | | |
| 8 | R¹ and R⁵ = CH₃ R³ = CH₂—NH—t-C₄H₉ | 1.0 | Mn | 0.46 | 0.49 | 345 | 1.9 | 48 |
| 9 | R¹ and R⁵ = CH₃ R³ = CH₂—NH—t-C₄H₉ | 1.0 | Mn | 0.75 | 0.88 | 580 | 4.6 | 62 |
| 10 | None - Control Runs | 0 | Cu | 0.45 | 0.44 | 480 | 1.5 | 64 |
| 11 | R¹, R³ & R⁵ = Same as Run No. 4 | 1.0 | Cu | 0.46 | 0.68 | 1231 | 5.1 | 75 |
| 12 | R¹, R³ and R⁵ = Same as Run No. | 2.0 | Cu | 0.49 | 0.72 | 950 | 6.2 | 68 |

[1] I.V. = intrinsic viscosity of powders measured in chloroform at 25° C
[2] I.V. = intrinsic viscosity of compression molded (2 minutes at 270° C) films (5–10 mils thick) measured in chloroform at 25° C
[3] N.I. = notched Izod Impact Strength (ft.-lbs./in.)
[4] E = elongation percent As illustrated by the data summarized in Table I above, aminophenols having an amino group para to the hydroxyl group in contradistinction to aminophenols having an amino group ortho to the hydroxyl group when employed in the preparation of polyphenylene oxides provide polymers which in combination with polystyrene having improved mechanical strength properties.

Especially useful polyphenylene oxide resins of this invention generally suited to the preparation of polymer blends with other polymeric materials such as high impact polystyrene — which blends can be molded, calendered, or extruded as films, coatings threads, filaments, tapes and the like by conventional techniques — are polymers having an intrinsic viscosity of from 0.17 to 1.0, preferably from 0.4 to 0.7, deciliters per gram, or even higher as measured in chloroform at 25° C. In general, their number average molecular weight, $\overline{M}n$, can be any number average molecular weight and is within the range of from about 5,000 to about 60,000, and preferably from about 15,000 to about 30,000.

The polymers of this invention can be combined with various fillers, modifying agents, etc., such as dyes, pigments, stabilizers, flame retardants, etc.

Other modifications and variations of the present invention are possible in light of the above teachings. It is therefore, to be understood that changes may be made in the particular embodiments of the invention described herein which embodiments are within the full intended scope of the invention as defined by the appended claims.

I claim:
1. The process of forming self-condensation products of (a) an aminophenol of the formula

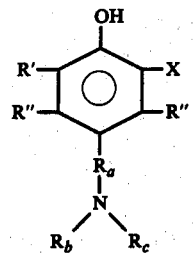

wherein X is hydrogen, chlorine, bromine, or iodine, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen, $R_a$ being methylene or a substituted methylene hydrocarbon group, $R_b$ and $R_c$ being acyclic or cyclic, saturated or unsaturated hydrocarbon groups, subject to the proviso that $R_b$ and $R_c$ either alone or in combination do not constitute an aromatic ring structure having an aromatic ring carbon atom directly bonded to the nitrogen atom of the amino group and further subject to the proviso that at least one of $R_b$ or $R_c$ is a hydrocarbon group, and (b) another phenol of the formula

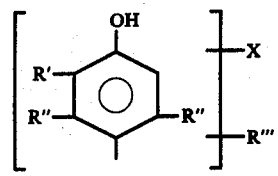

wherein X, R' and R" are the same as defined hereinbefore with respect to the aminophenol and R'" being the same as R' and in addition, a halogen.

2. The claim 1 process wherein $R_a$ is a divalent alkylene radical, $R_b$ is a primary or secondary alkyl radical, and $R_c$ is a primary or secondary alkyl radical.

3. The claim 2 process wherein $R_b$ and $R_c$ are $C_{1-5}$ alkyl radicals.

4. The claim 3 process wherein $R_a$ is a methylene radical.

5. The claim 1 process wherein $R_a$ is a divalent alkylene radical, $R_b$ is a hydrogen, a primary or secondary alkyl radical, and $R_c$ is a primary or secondary alkyl radical.

6. The claim 5 process wherein the another phenol is 2,6-dimethylphenol.

7. A polyphenylene oxide-styrene resin blend comprising a polyphenylene oxide of the process of claim 1 and a styrene resin having at least 25 percent by weight of polymer derived from a compound of the formula

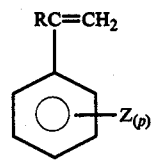

where R is hydrogen, lower alkyl or halogen; Z is a member selected from the class consisting of vinyl, hydrogen, chlorine and lower alkyl; and p is a whole number equal to from 0 to 5.

8. The claim 7 composition wherein the weight ratio of polyphenylene oxide to styrene is from 30:70 to 70:30.